Figure 2:
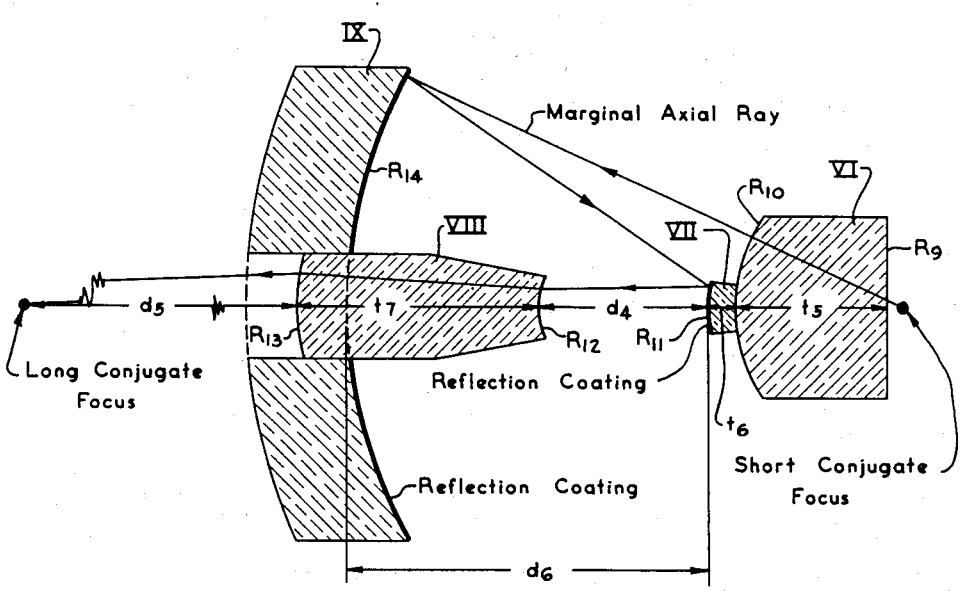

Aug. 29, 1950    D. S. GREY    2,520,636
OPTICAL OBJECTIVE

Filed May 7, 1949    2 Sheets—Sheet 1

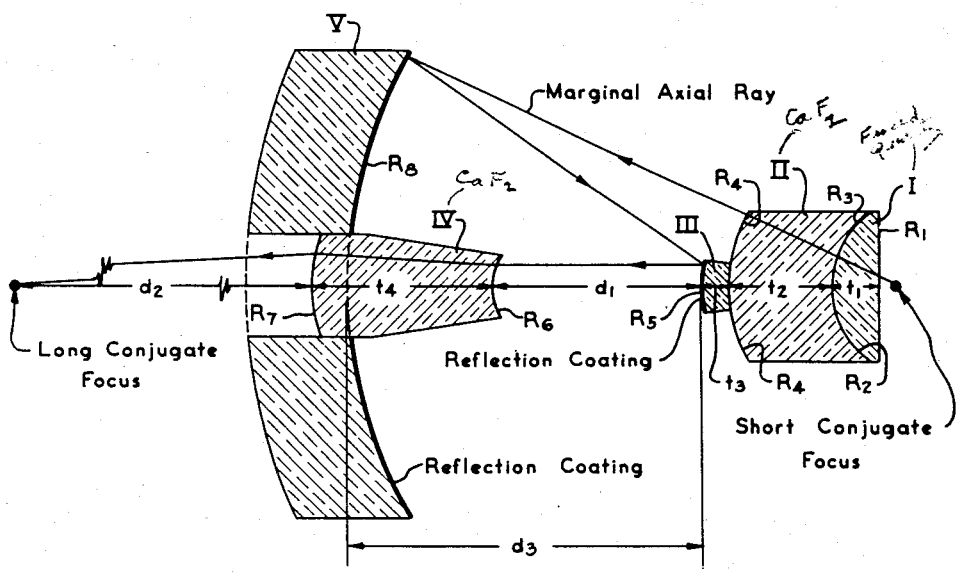

FIG. 1

| ELEMENT | RADIUS | SPACING & THICKNESS | MATERIAL |
|---|---|---|---|
| LENS I | $R_1 = \infty$ | | Fused Quartz |
| | $R_2 = 4.499$ | $t_1 = 2.287$ | |
| LENS II | $R_3 = 4.499$ | | Calcium Fluoride |
| | $R_4 = 7.317$ | $t_2 = 5.4$ | |
| MIRROR III | $R_5 = 4.539$ | $t_3 = 1.2$ | |
| LENS IV | $R_6 = 2.727$ | $d_1 = 10.5$ | Calcium Fluoride |
| | $R_7 = 6.977$ | $t_4 = 9.0$ | |
| | | $d_2 = 300.0$ | |
| MIRROR V | $R_8 = 22.848$ | $d_3 = 17.7$ | |

Corrected for:   Cover Slide – Fused Quartz – 0.2 mm.
                 Immersion Liquid – Water – 0.187 mm.

INVENTOR
David S. Grey
BY Donald L. Brown
and Moncure B. Berg
Attorneys

Aug. 29, 1950     D. S. GREY     2,520,636
OPTICAL OBJECTIVE

Filed May 7, 1949     2 Sheets-Sheet 2

| ELEMENT | RADIUS | SPACING & THICKNESS | MATERIAL |
|---|---|---|---|
| LENS VI | $R_9 = \infty$ | | Calcium Fluoride |
| | $R_{10} = 7.637$ | $t_5 = 7.53$ | |
| MIRROR VII | $R_{11} = 4.537$ | $t_6 = 1.2$ | |
| LENS VIII | $R_{12} = 3.355$ | $d_4 = 9.0$ | Calcium Fluoride |
| | $R_{13} = 9.091$ | $t_7 = 12.0$ | |
| | | $d_5 = 300.0$ | |
| MIRROR IX | $R_{14} = 23.139$ | $d_6 = 18.0$ | |

Corrected for: Cover Slide - Fused Quartz - 0.2 mm.
                Immersion Liquid - Water - 0.2 mm.

INVENTOR
David S. Grey
BY Donald L. Brown
and
Moncure B. Berg
Attorneys

Patented Aug. 29, 1950

2,520,636

UNITED STATES PATENT OFFICE 2,520,636

OPTICAL OBJECTIVE

David S. Grey, Weston, Mass., assignor to Polaroid Corporation, Cambridge, Mass., a corporation of Delaware Application May 7, 1949, Serial No. 91,908

11 Claims. (Cl. 88—57)

This invention relates to optical systems and more particularly has reference to objectives making use of reflecting elements and refracting elements.

This application is a continuation-in-part of my copending application Serial No. 55,588, filed October 20, 1948, for Optical Systems.

Objects of the invention are to provide optical objectives employing comparatively few component parts without resorting to aspheric surfaces but which are well corrected throughout a region of the electromagnetic spectrum ranging from the medium ultraviolet into the infrared, and which comprise a plurality of optically aligned catoptric (reflecting) and dioptric (refracting) components, respectively, comprising a mirror element having a central opening therethrough and in surrounding relation to said opening a concave reflecting surface which faces the convex reflecting surface of a second mirror element and at least one refractive element which is physically located between said convex mirror and the short conjugate focus of said objective and is optically located between said concave mirror and the short conjugate focus of the objective, and at least one other refractive element physically and optically located between said convex mirror and the long conjugate focus of said objective with said last-named refractive element serving to correct aberrations of the objective and to seal the opening through said concave mirror, and with all refractive elements formed of material capable of transmitting light throughout said wavelength range.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a sectional view of an objective lens system embodying one form of the invention and especially adapted for microscopy; and Fig. 2 is a sectional view of an objective lens system embodying another form of the invention and also adapted for microscopy.

In my copending application Serial No. 55,588, I have described an objective making use of a concave mirror element and a convex mirror element which are optically aligned with each other in spaced-apart relation and which are also optically aligned with a plurality of refractive elements (dioptric components). The two mirror elements (catoptric components) are arranged so that their reflecting surfaces are opposed to each other and the refractive elements are positioned between the convex mirror and the short conjugate focus of the objective with the convex mirror element mounted on that refractive surface most distant from the short conjugate focus. In the objective described in the previously mentioned application the convex mirror element is formed of glass having a convex surface which is coated with a suitable reflection coating and the element is secured to the refractive surface just mentioned as by cementing it thereto. All of the refractive elements are formed of materials which transmit light in the ultraviolet region of the spectrum.

The objective described in my previously mentioned application has a relatively high numerical aperture and a low obscuring ratio and is of a design providing a relatively large number of air-exposed refractive surfaces. In this earlier design, the concave mirror element is provided with an opening therethrough which is unsealed and hence permits the collection of dust and dirt on the various refracting and reflecting surfaces of the objective.

As intimated, the present invention intends to provide an optical system which fulfills the functions of the objectives disclosed in the aforementioned application but with a simpler design which possesses a minimum of air-exposed refracting surfaces and which is provided with a dust seal, the latter having the adidtional function of providing certain corrections for this system.

With reference to the drawings, Fig. 1 illustrates one embodiment of the invention showing a microscope objective of the immersion type. This objective comprises a plurality of optically aligned dioptric and catoptric components. All optical surfaces in Fig. 1 are spherical, the one plane surface disclosed being treated as a spherical surface of infinite radius.

In Fig. 1, the dioptric components comprise refractive lens elements I, II and IV. Lens I is a plano-convex element while lens II is a concave-convex element providing a relatively thick meniscus, the concave surface of which is in contact with and is cemented to the convex surface of element I. Lens element IV, which provides a dust seal and is in the form of a window, is also concave-convex and provides a negative meniscus element.

The catoptric components of the objective comprise a mirror element III having a continuous convex reflecting surface, and a concave mirror element V. Mirror III may be mounted directly on the refractive element II on the surface thereof most distant from the short conjugate focus of the objective with the reflecting surface thereof facing the long conjugate focus of the objective. The mirror element V is provided with an opening extending centrally therethrough, and has a continuous concave reflecting surface in surrounding relation to the opening. Mirror elements III and V are positioned so that their reflecting surfaces face each other and are located on the side of the dioptric components I and II which includes the long conjugate focus of the objective. Mirror elements III and V are solely reflecting and perform no refractive functions in the system of this invention.

Physically, the lens element IV has, in part, a diameter corresponding to the opening in the mirror element V and partially extends within this opening. As shown, lens element IV has the surface thereof which is closest to the long conjugate focus located within the mirror opening although it is possible to position the element IV so that this surface lies between the long conjugate and the nonreflecting surface of the mirror V. A dioptric component optically located between the convex mirror and the long conjugate focus is advantageous, particularly in regard to control of certain extra-axial aberrations.

The objective of Fig. 1 is corrected for cover slide thickness and immersion liquid. The full line with arrows thereon appearing in Fig. 1 illustrates the path direction of light traversing the objective from an object in immersion contact with the objective and located at the short conjugate focus by tracing a marginal axial ray through the objective. As illustrated, such a ray proceeds through elements I and II wherein it is refracted and is directed onto the mirror element V to be reflected and directed onto the mirror element III where it is again reflected and is then directed onto the lens element IV for transmission therethrough and redirection to the long conjugate focus.

The elements I, II and IV are formed of optical media which are capable of transmitting ultraviolet radiation, visible light, and near infrared radiation. Examples of materials of this character are calcium fluoride, lithium fluoride, fused quartz, sodium chloride, potassium bromide, β-magnesium oxide, potassium chloride and the like. Of these materials, fused quartz and substantially pure or artificially grown crystals of calcium fluoride may be named as preferred. Materials of the character just noted are capable of transmitting light throughout a wavelength range of from below 2200 Å. to beyond 6000 Å., the wavelength range for which the objective is corrected.

The reflection coatings for the elements III and V of the objective are preferably formed of aluminum. Other materials may be employed, such as, for example, silver and the like, to provide reflection coatings.

Table 1 below gives the constructional data with dimensions in millimeters for the specific example of the immersion objective illustrated in Fig. 1. It is pointed out that this data is computed to include the use of a fused quartz cover slide and water as an immersion liquid, the thicknesses allowed for these materials being 0.2 millimeter and 0.187 millimeter respectively.

Table 1

| Element | Radius | Spacing and thickness | Material |
| --- | --- | --- | --- |
| Lens I | $R_1 = \infty$<br>$R_2 = 4.499$ | $t_1 = 2.287$ | Fused Quartz. |
| Lens II | $R_3 = 4.499$<br>$R_4 = 7.317$ | $t_2 = 5.4$<br>$t_3 = 1.2$ | Calcium Fluoride. |
| Mirror III | $R_5 = 4.539$ | | |
| Lens IV | $R_6 = 2.727$<br>$R_7 = 6.977$ | $d_1 = 10.5$<br>$t_4 = 9.0$<br>$d_2 = 300.0$ | Do. |
| Mirror V | $R_8 = 22.848$ | $d_3 = 17.7$ | |

Table 1a below gives representative ultraviolet indices of the preferred refractive materials and also the indices at corresponding wavelengths for water which is the preferred immersion liquid.

Table 1a.—Refractive index (n)

| Wavelength | Calcium fluoride | Fused quartz | Water |
| --- | --- | --- | --- |
| 2200 Å | 1.4811 | 1.52861 | 1.3983 |
| 2400 Å | 1.47123 | 1.51347 | 1.3828 |
| 2700 Å | 1.46093 | 1.49811 | 1.3682 |
| 3200 Å | 1.45057 | 1.48282 | 1.3542 |
| 4000 Å | 1.44187 | 1.47022 | 1.3432 |

Suitable materials for use as immersion liquid, besides water, are cyclohexane and also an appropriate mixture of water and glycerine.

The magnification between the short and long conjugate foci of the objective of Fig. 1 is 170×. The objective of Fig. 1 has a numerical aperture up to 0.9 and a focal length of 1.77 millimeters. The optical medium for lens element I is fused quartz and that for lens element II as well as lens element IV is calcium fluoride.

Another embodiment of the invention, disclosed in Fig. 2, is likewise illustrated in connection with a microscope objective of the immersion type.

In Fig. 2, the dioptric components comprise refractive lens elements VI and VIII both formed of calcium fluoride. Lens element VI is a plano-convex element while lens element VIII, which provides a dust seal and is in the form of a window, is a concave-convex member and provides a negative meniscus element similar to the element IV of Fig. 1.

The catoptric components of the objective of Fig. 2 comprise a mirror element VII having a continuous convex reflecting surface and a concave mirror IX. As in the design of Fig. 1, the convex mirror is mounted directly on a refractive surface, which in Fig. 2 is the convex surface of the element VI. Also, the mirror element IX, like the mirror element V, is provided with an opening extending centrally therethrough and has a continuous concave reflecting surface in surrounding relationship to the opening. Mirror elements VII and IX are positioned so that their reflecting surfaces face each other and are located on the side of the dioptric component VI which includes the long conjugate focus of the objective.

As in the objective of Fig. 1, the negative meniscus VIII of Fig. 2 is adapted to extend within the opening in the mirror element IX and to effectively close this opening. The location of the refracting surfaces of the element VIII of Fig. 2 is subject to the same conditions and requirements affecting the location of the corresponding element IV in the design of Fig. 1. Likewise, all optical surfaces in Fig. 2 are spherical.

It is to be observed that the objective of Fig. 2 employs only one dioptric component on the short conjugate side of the convex mirror element, and also that the objective of Fig. 2 illustrates the design of a system which employs only one lens material.

Table 2 below gives the constructional data with dimensions in millimeters for the specific example of the objective illustrated in Fig. 2. It is pointed out that this data is computed to include the use of a fused quartz cover slide and water as an immersion liquid, the thicknesses allowed for these materials each being 0.2 millimeter.

Table 2

| Element | Radius | Spacing and thickness | Material |
|---|---|---|---|
| Lens VI | $R_9 = \infty$ | $t_5 = 7.53$ | Calcium Fluoride. |
|  | $R_{10} = 7.637$ | $t_6 = 1.2$ |  |
| Mirror VII | $R_{11} = 4.537$ | $d_4 = 9.0$ |  |
| Lens VIII | $R_{12} = 3.355$ | $t_7 = 12.0$ | Do. |
|  | $R_{13} = 9.091$ | $d_5 = 300.0$ |  |
| Mirror IX | $R_{14} = 23.139$ | $d_6 = 18.0$ |  |

The magnification between the short and long conjugate foci of the objective of Fig. 2 is 150×. The objective of Fig. 2 has a numerical aperture up to 0.9 and a focal length of 2 millimeters. The optical material for lens elements VI and VIII is calcium fluoride. Mirror elements VII and IX are constructed of the materials and in the manner set forth in connection with the mirror elements of the objective of Fig. 1.

In the design of reflecting optics, it is generally necessary to consider the effect produced by one element obscuring another element. For example, in a simple type of reflecting objective consisting solely of a concave mirror having a central opening therethrough and a small convex mirror in optical alignment therewith, a central portion of the aperture of the objective is obscured by the convex mirror. This obscuration causes a certain portion of the energy transmitted by the optical system or objective to appear outside the central disc of the diffraction pattern. About 85% of the transmitted energy appears in the central disc of the diffraction pattern of an optical system which is free of aberrations and which has a circular unobscured aperture. If a small central portion of the aperture is obscured, the percent of energy falling within the central disc is 85% minus the obscuring ratio $a/A$, where $a$ is the obscured area and $A$ is the area of the free aperture before obscuration. This deterioration of the diffraction pattern may be further increased by the presence of supporting members used to carry the convex mirror.

In the lens mirror systems of Figs. 1 and 2 it may be observed that but one air-exposed refractive surface is optically located between the concave mirror and the short conjugate focus and that the convex mirror is cemented to this surface. If no other elements are used in a system of this general character, that is to say, if the negative meniscus forming the window element IV or VIII is omitted, the refractive surface which supports the convex mirror must have its center of curvature approximately at the short conjugate focus to provide freedom from longitudinal chromatic aberration. In the just-assumed system wherein the negative meniscus is omitted, the obscuring ratio at which spherical aberration and coma are corrected will be the same as for a system containing two reflecting elements only and is of the order of about 15 to 20 percent. A further defect in such an assumed system would reside in the presence of a large residual of lateral color or variation of magnification with color. To correct for such aberration, an eyepiece probably containing four air-exposed refractive surfaces would be required.

The window element provided by the negative meniscus lens IV and the negative meniscus lens VIII is useful for eliminating the difficulties of the just-described arrangement. The meniscus element may be chosen so as to provide residual aberration of such sign that the obscuring ratio may be reduced to less than 10 percent in area. Also, the meniscus arrangement may be utilized to introduce an amount of chromatic aberration sufficient to avoid the use of an eyepiece between the microscope objective and a photographic film on which the image formed by the objective is recorded.

The simple reflecting objective heretofore referred to as consisting solely of a concave mirror element and a convex mirror element possesses an intermediate numerical aperture. A larger numerical aperture for this simple reflecting objective may be obtained by its conversion to an immersion objective. This conversion may be carried out by the use of a plano-convex element inserted between the convex mirror and the short conjugate focus with the plano surface thereof adjacent the short conjugate focus and the convex surface of this element having its center of curvature approximately at the short conjugate focus. The result of the conversion is to provide an increased numerical aperture which will have a value equal to the numerical aperture of the two-mirror element objective multiplied by the index of refraction of the plano-convex refracting element. However, improvement of numerical aperture by the practice is obtained without improvement of aberrations and obscuring ratio inherent in an objective system consisting solely of the two reflecting elements heretofore mentioned.

It may be shown that it is desirable to reduce the obscuring ratio in an objective of the reflecting type to less than 10 percent in area. It is possible to arrange a concave mirror element and a convex mirror element in a two-element objective so that the percentage of area obscured is smaller than 15 to 20 percent. In such a case, however, either the spherical aberration becomes undercorrected, or the coma becomes inward or both. Coma is treated herein as for light travelling from the short conjugate focus to the long conjugate focus.

Lens elements IV in Fig. 1 and VIII in Fig. 2 may be chosen so as to give overcorrected spherical aberration or outward coma, or both. It is thus apparent that these aberrations compensate those arising from the pair of mirrors associated with element IV or VIII when the mirrors are rearranged to reduce obscuring ratio. At the same time, lens elements IV and VIII may or may not introduce astigmatism into the optical system. For convenience in construction it is desirable that lens elements IV and VIII be thin and located not too near the convex mirror. On the other hand, if these components are thin they require steep curvatures to provide the desired corrections and if they are too far removed from the convex mirror III or VII, the amount of astigmatism introduced becomes excessive.

In the objectives of Figs. 1 and 2 the lens elements IV and VIII are arranged so as to provide the complete correction for variation of magnification with wavelength in addition to providing the corrections required above. In the absence of lens elements IV and VIII, the magnification would be approximately proportional to the index of the lens element adjacent the object. In order to provide correction for variation of magnification with wavelength, the surface of the window element IV or VIII nearest the long conjugate focus must be convex. Correction of this aberration also requires either that the lens element IV or VIII be very thick or that the curvatures of the surfaces thereof be relatively great. It would, of course, be possible to substitute for the window element two separated elements, one a positive lens near the long conjugate focus, the other a negative element between said positive lens and the convex mirrow. This expedient would remove the necessity for use of a very thick lens but would introduce two extra air-exposed refracting surfaces. From the foregoing it is obvious that the form of lens elements IV and VIII may be very greatly altered and will be determined by such considerations as: how much residual astigmatism is allowed, whether variation of magnification with color is to be completely eliminated, the limits set on the obscuring ratio, and the steepness of the curvatures for the window element.

Rays from the axial point should strike the air-exposed surface situated between the short conjugate focus and the concave mirror at nearly normal incidence. It has been found that larger numerical apertures may be obtained if the center of curvature of this surface is slightly shorter than the distance from this surface to the short conjugate focus.

The physical separation between the convex and concave mirror surfaces, disclosed in the various embodiments of the present invention, is so selected that these surfaces are spaced apart by a distance selected to provide a paraxial incident height on the concave reflecting surface which is at least three times greater than the paraxial incident height on the convex reflecting surface carried by the convex surface of the refractive element located closest to the short conjugate focus.

The refractive surfaces in the objectives illustrated herein are adapted to correct the mirror surfaces employed in these systems. It is desirable that the refractive components not only compensate the aberrations of mirror surfaces at one wavelength of incident radiation, but that a useful system should be provided which possesses stability of correction over a large wavelength interval. I have found that the refractive components for a system may be so arranged that the correction is stable for changes in index up to about 0.1. As previously stated, it is possible to sufficiently reduce the change in aberrations with wavelength by use of only one refractive material. Since correction is possible with only one optical medium, the design may be adapted to any wavelength of the electromagnetic spectrum in which there is a transparent optical medium of refractive index greater than 1.0. The objective systems illustrated are corrected for the visible spectrum and large portions of the infrared and ultraviolet spectra simultaneously.

While the invention has been illustrated in connection with objectives of the immersion type, it will be appreciated by those skilled in the art that with suitable modification the systems disclosed herein may be utilized as dry objectives. For example, the refractive surfaces having radii $R_1$ and $R_6$ and respectively appearing in Figs. 1 and 2 may be spherical surfaces each of which has its center of curvature located at the short conjugate focus of its respective system.

While finding their chief usefulness in the field of microscopy, especially for immersion work, it is possible to employ the objectives of this invention for projection or photographic purposes with slight modification thereof, provided it is acceptable to locate the print to be projected or the film to be exposed in very close proximity to the plane surface of the elements I or VI since the short conjugate focus will lie very close to this surface. When any of these designs are employed for photographic work, the ray path followed will be like that disclosed in the drawing except that the light will proceed in a direction reverse from that shown by the arrows on the marginal axial ray traced through the objectives of Figs. 1 and 2.

The diameter of the convex mirror elements of the objectives illustrated, as well as the width of the ring-shaped reflecting surface of the concave mirror elements of these objectives, are dependent, as will be well understood by the art, upon the optical media and curvatures employed to make the most efficient use of the systems illustrated.

While the optical systems of my invention have been shown in conjunction with optical media which transmit ultraviolet, visible and infrared radiations, it is to be understood that the designs set forth may be carried out with other optical materials which have a transmission over a more limited wavelength range. For example, the systems disclosed herein are well adapted to be carried out with optical media which will not transmit ultraviolet radiations but will transmit visible light, as for example, glass and the like.

"Mirror element" as used herein is understood to comprise the reflecting surface of a member bearing said reflecting surface or a member supporting said reflecting surface. Specifically it refers to that portion of the surface which is reflection coated.

From the foregoing it may be observed that in accordance with the teaching set forth, I have fulfilled the objects and novel aims of my invention and have provided novel and improved optical systems for the various uses noted herein.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In an optical objective for use throughout a wavelength range extending from within the medium ultraviolet region of the spectrum to within the infrared region, a plurality of optically aligned catoptric and dioptric components, said catoptric components comprising a concave mirror having a concave reflecting surface surface and a convex mirror having a convex reflecting surface, both said reflecting surfaces being substantially spherical and said concave mirror having an opening extending centrally therethrough with the concave reflecting surface in surrounding relation to said opening, said mirrors being positioned to have the reflecting surfaces thereof facing each other and to have said concave reflecting surface facing the short conjugate focus of said objective, said dioptric components comprising at least one refractive element physically located between the convex mirror and the short conjugate focus of the objective but optically located between the concave mirror and the short conjugate focus, and at least one other refractive element which is physically and optically located between the convex mirror and the long conjugate focus of the objective, said refractive elements having substantially spherical surfaces and correcting said catoptric components for spherical aberration and coma for differences in index of refraction caused by changes in refractive index of a magnitude up to about 0.1 in accordance with variation in the wavelength of light throughout said range while maintaining the position of the conjugate foci of the objective substantially constant for said difference and, in conjunction with said catoptric components, providing an objective having a numerical aperture up to about 0.9, said convex mirror being located closely adjacent that refractive surface which is farthest removed from said short conjugate focus and which is optically located between the concave mirror and the short conjugate focus and said convex mirror partially obscuring a small central portion of said refractive surface for the transmission of light therethrough.

2. An optical objective as defined in claim 1 wherein said convex mirror is mounted directly on that refractive surface which is optically located between the concave mirror and the short conjugate focus of the objective and which is farthest removed from the short conjugate focus, and wherein said convex mirror obscures not more than 10% of light incident on said refractive surface.

3. An optical objective as defined in claim 1 wherein said refractive element which is physically and optically located between the convex mirror and the long conjugate focus of the objective comprises a negative meniscus lens.

4. An optical objective as defined in claim 1 wherein said refractive element which is physically and optically located between the convex mirror and the long conjugate focus of the objective comprises a negative meniscus lens which partially extends within the opening through said concave mirror.

5. An optical objective as defined in claim 1 wherein said refractive element which is physically and optically located between the convex mirror and the long conjugate focus of the objective comprises a negative meniscus lens, and wherein said convex mirror is mounted directly on that refractive surface which is optically located between the concave mirror and the short conjugate focus of the objective and is most removed from said short conjugate focus, said convex mirror obscuring a small central portion of said refractive surface for the transmission of light therethrough.

6. An optical objective as defined in claim 1 wherein said refractive element which is physically and optically located between the convex mirror and the long conjugate focus of the objective comprises a negative meniscus lens which partially extends within the opening through said concave mirror, and wherein said convex mirror is mounted directly on that refractive surface which is optically located between the concave mirror and the short conjugate focus of the objective and is most removed from said short conjugate focus, said convex mirror obscuring a small central portion of said refractive surface for the transmission of light therethrough.

7. An objective as defined in claim 1 wherein said mirror reflecting surfaces are spaced apart by a distance selected to provide a paraxial incident height on the concave reflecting surface which is at least three times greater than the paraxial incident height on the convex reflecting surface.

8. An optical objective as defined in claim 1 wherein said mirror reflecting surfaces are spaced apart by a distance selected to provide a paraxial incident height on the concave reflection surface which is at least three times greater than the paraxial incident height on the convex reflecting surface, and wherein said convex mirror is located closely adjacent that refractive surface which is optically located between the concave mirror and the short conjugate focus and which is farthest removed from the short conjugate focus of said objective, said convex mirror partially obscuring a small central portion of said refractive surface for the transmission of light therethrough.

9. An objective as defined in claim 1 wherein said refractive elements are formed of the same optical medium.

10. An objective as defined in claim 1 wherein said refractive element which is physically located between the convex mirror and the short conjugate focus of the objective but which is optically located between the concave mirror and the short conjugate focus is provided with a convex surface which has the center of curvature thereof located at the short conjugate focus of the objective.

11. An objective as defined in claim 1 wherein a hemisphere comprises that refractive element which is physically located between the convex mirror and the short conjugate focus of said objective but which is optically located between said concave mirror and said short conjugate focus.

DAVID S. GREY.

REFERENCES CITED

The following references are of record in the file of this patent:

UNITED STATES PATENTS

| Number    | Name        | Date          |
|-----------|-------------|---------------|
| 2,141,884 | Sonnefeld   | Dec. 27, 1938 |
| 2,198,014 | Ott         | Apr. 23, 1940 |
| 2,378,301 | Kaperellian | June 12, 1945 |
| 2,380,887 | Warmisham   | July 31, 1945 |
| 2,380,888 | Warmisham   | July 31, 1945 |
| 2,403,660 | Hayward     | July 9, 1946  |
| 2,413,286 | Buchele     | Dec. 31, 1946 |

FOREIGN PATENTS

| Number  | Country       | Date          |
|---------|---------------|---------------|
| 82,671  | Germany       | Aug. 7, 1895  |
| 538,622 | Great Britain | Aug. 11, 1941 |
| 544,694 | Great Britain | Apr. 23, 1942 |